United States Patent
Sarnoff et al.

(10) Patent No.: US 8,881,905 B2
(45) Date of Patent: *Nov. 11, 2014

(54) PAN HAVING SECURED THERETO ROASTING MATERIALS

(75) Inventors: Norton Sarnoff, Northbrook, IL (US); David Sarnoff, Northbrook, IL (US); Raj Patel, Lake Zurich, IL (US)

(73) Assignee: Handi-Foil Corporation, Wheeling, IL (US)

(*) Notice: Subject to any disclaimer, the term of this patent is extended or adjusted under 35 U.S.C. 154(b) by 31 days.

This patent is subject to a terminal disclaimer.

(21) Appl. No.: 13/231,083

(22) Filed: Sep. 13, 2011

(65) Prior Publication Data
US 2013/0037430 A1  Feb. 14, 2013

Related U.S. Application Data

(63) Continuation-in-part of application No. 13/209,135, filed on Aug. 12, 2011, now Pat. No. 8,496,112.

(51) Int. Cl.
*A45C 11/20* (2006.01)
*B65D 81/34* (2006.01)

(52) U.S. Cl.
CPC ...... *B65D 81/343* (2013.01); *B65D 2581/3418* (2013.01)
USPC .............. 206/541; 206/223; 426/113; 53/415

(58) Field of Classification Search
CPC ........... B65D 81/3453; B65D 81/3416; A32L 1/0128
USPC ......... 206/223, 541, 542, 216, 217, 204, 548; 229/906, 903, 902; 426/112, 113, 129, 426/132; 53/415, 445, 474; 220/573.4, 220/574.3, 574, 912, 495.03, 495.06
See application file for complete search history.

(56) References Cited

U.S. PATENT DOCUMENTS

| | | | |
|---|---|---|---|
| 4,754,369 A | 6/1988 | Nilsson | |
| 6,048,558 A | 4/2000 | Feldmeier et al. | |
| 6,290,998 B1* | 9/2001 | Layton et al. | 426/113 |
| 6,579,549 B1 | 6/2003 | Thrasher et al. | |
| 7,476,830 B2 | 1/2009 | Middleton et al. | |
| 7,939,786 B2 | 5/2011 | Edwards et al. | |
| 2002/0038802 A1* | 4/2002 | Tersch | 220/573.4 |
| 2005/0008738 A1* | 1/2005 | Tarver | 426/129 |
| 2006/0219578 A1* | 10/2006 | Owensby | 206/204 |
| 2006/0263493 A1 | 11/2006 | Bjork et al. | |

(Continued)

OTHER PUBLICATIONS

Photo of Item purchased in Canada on Oct. 28, 2011.

(Continued)

*Primary Examiner* — David Fidei
(74) *Attorney, Agent, or Firm* — Adam K. Sacharoff; Much Shelist

(57) ABSTRACT

In summary there is provided in one embodiment a combination of a pan with a label for holding a roasting bag. The pan is defined by having a bottom base having a base periphery edge and a sidewall extending upwardly from the base periphery edge and terminating at a side edge to create a well therebetween. The label includes front and rear sides. The rear side being secured to the bottom base and includes a pocket formed thereon. The pocket has an access opening into an internal space of the pocket. The roasting bag is positioned within and removable from the pocket of the label.

26 Claims, 6 Drawing Sheets

(56) References Cited

U.S. PATENT DOCUMENTS

2007/0051729 A1    3/2007    Osborne
2007/0164035 A1\*  7/2007    Blucher .................... 220/573.4
2008/0063758 A1\*  3/2008    Kwiat et al. ................. 426/120
2008/0199577 A1\*  8/2008    Jensen et al. ................ 426/393
2011/0100351 A1    5/2011    Dupuie et al.

OTHER PUBLICATIONS

US Patent Office Action Copending U.S. Appl. No. 13/209,135, Mailed Mar. 14, 2013.

\* cited by examiner

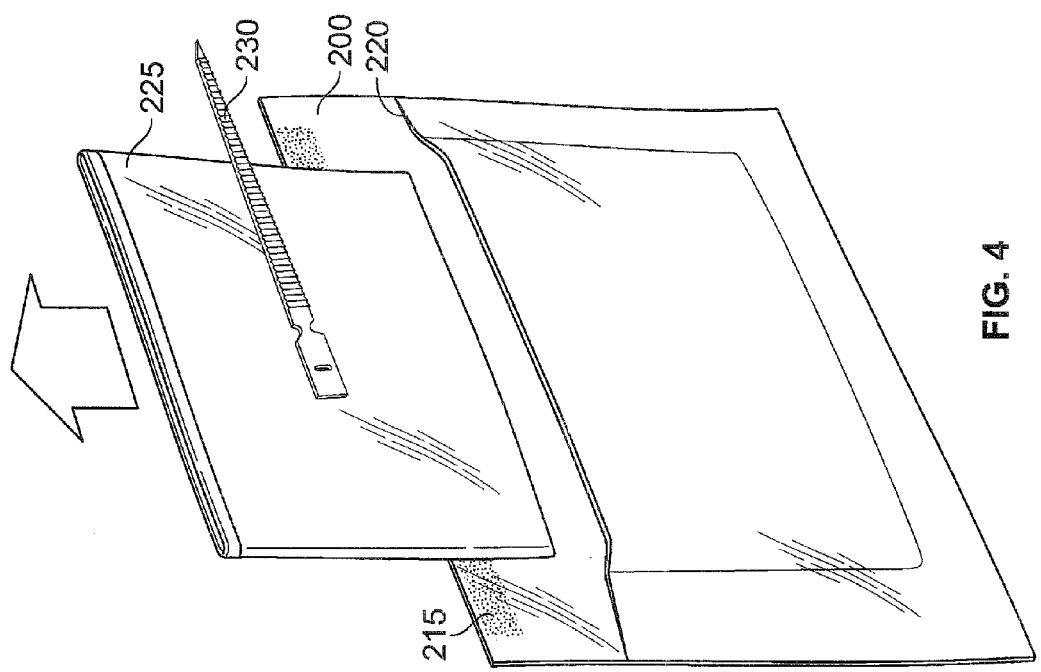
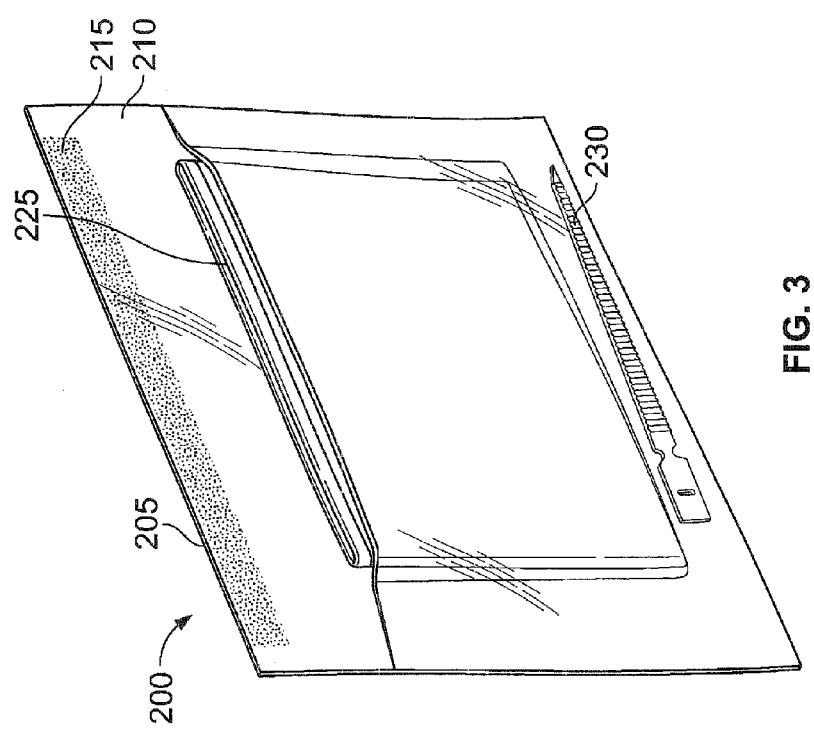
FIG. 3
FIG. 4

PAN HAVING SECURED THERETO ROASTING MATERIALS

CROSS REFERENCE TO RELATED APPLICATIONS

The present invention is a continuation in part application of Ser. No. 13/209,135 filed on Aug. 12, 2011.

FIELD OF THE INVENTION present invention relates to pans and more particularly to baking and roasting pans having secured thereto in a convenient manner to roasting materials.

BACKGROUND OF THE INVENTION

Baking and roasting pans otherwise referred to herein generally as pans, have long been used to cook food in ovens. Often used with the pans are cooking or roasting materials, such as but not limited to aluminum foil, plastic bags, etc. The aluminum foil is used to cover the food during roasting and the plastic bags are designed to place a roast, turkey, or other type of food in the bag for cooking and roasting. These additional roasting materials are typically sold separately. There is a need to provide a convenient manner in selling the roasting materials with the pan and more importantly a convenient manner in which to connect the roasting materials to the pan such that when sold the two do not accidentally separate.

SUMMARY OF THE INVENTION

In accordance with the present invention there is provided in one embodiment a pan used in connection with a label having a pouch or pocket to hold roasting materials, such as aluminum foil and/or roasting bags. The pan can be further defined to include a bottom base and sidewalls with the label being secured within a well defined thereby. The label includes a pocket either on the front or rear side. The pocket has an internal space for holding the roasting materials. The pocket is formed from different or the same material of the label.

In another aspect of the invention there is provided a method of attaching the roasting materials to a pan. In a first step, a pan is provided to include at least a bottom portion and sides extending from the bottom portion to form a well. In a second step, the label is provided which can be affixed to the bottom portion of the pan. The label has a pocket formed on one side of the label to define an interior pocket region. Upon obtaining the label, roasting materials are placed within the pocket region and then the label is affixed to the pan.

Numerous other advantages and features of the invention will become readily apparent from the following detailed description of the invention and the embodiments thereof, from the claims, and from the accompanying drawings.

BRIEF DESCRIPTION OF THE DRAWINGS

A fuller understanding of the foregoing may be had by reference to the accompanying drawings, wherein:

FIG. 3 is a perspective view of an underside of the label pouch;

FIG. 4 is a perspective view of the label pouch showing the removal of a roasting bag and a tie;

DETAILED DESCRIPTION OF THE EMBODIMENTS

Figure 1:
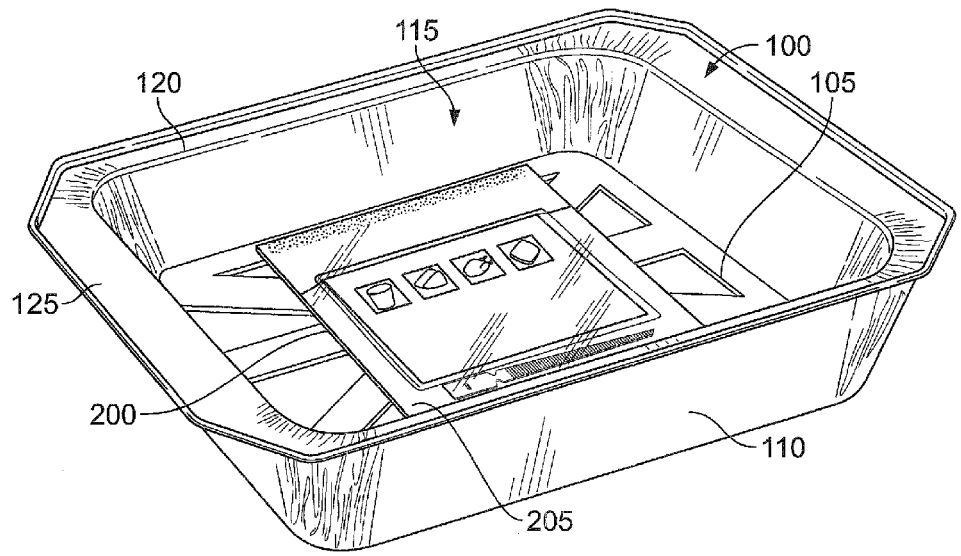
FIG. 1 is a perspective view of a pan having a label pouch for holding at least a roasting material in accordance with one embodiment of the invention.
Figure 2:
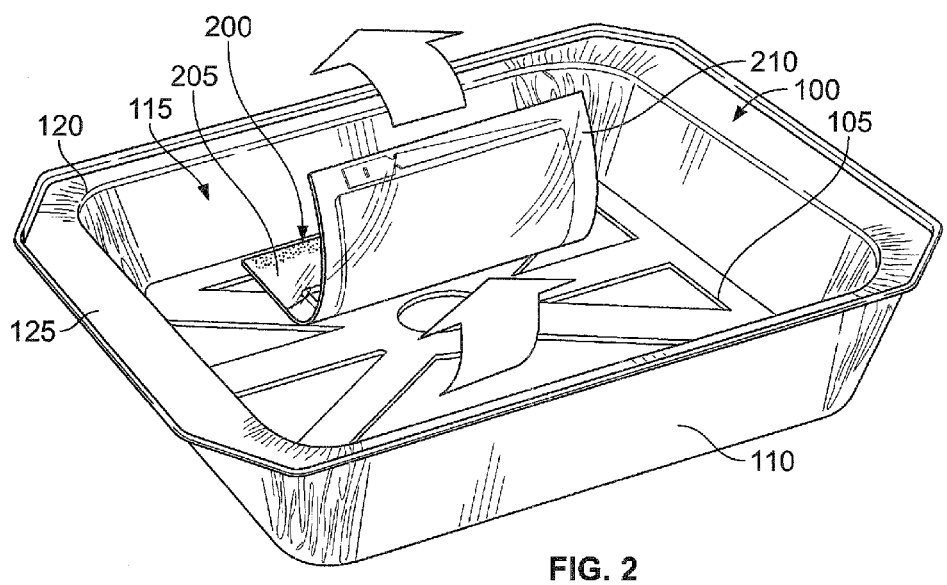
FIG. 2 is a perspective view of FIG. 1 showing the partial removal of the label.
Figure 5:
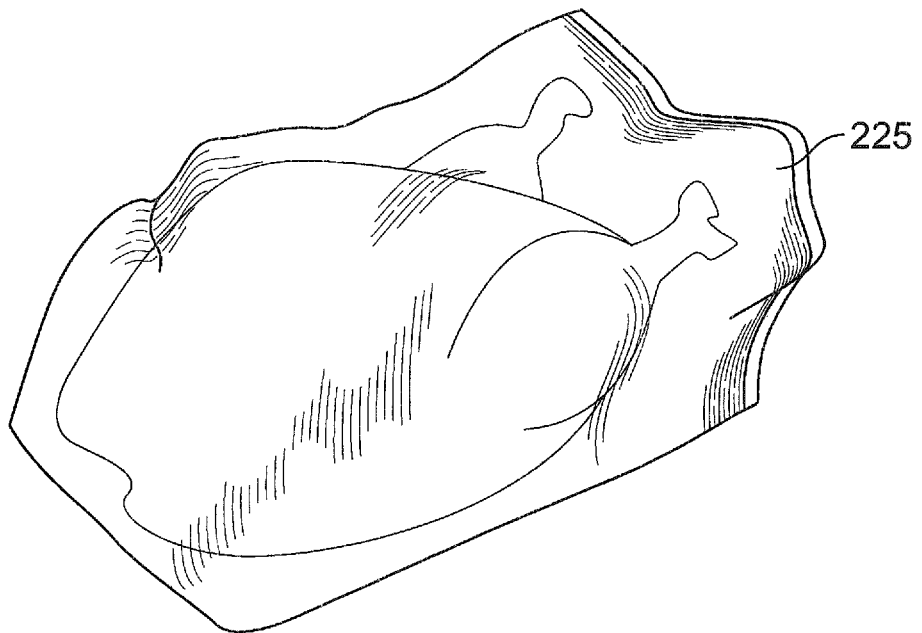
FIG. 5 is a perspective view of the use of the roasting bag.
Figure 6:
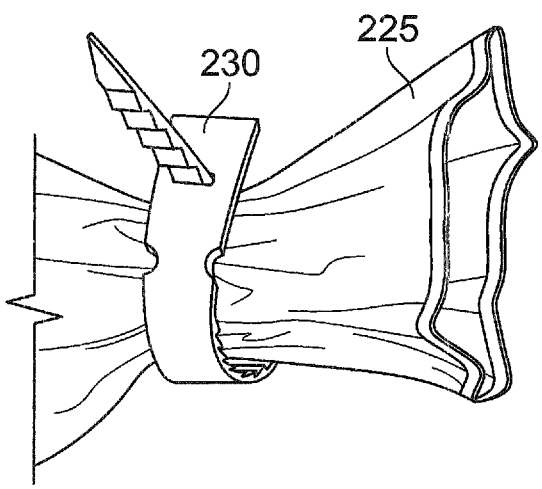
FIG. 6 is a perspective view of the use of a tie around a roasting bag.

While the invention is susceptible to embodiments in many different forms, there are shown in the drawings and will be described herein, in detail, the preferred embodiments of the present invention. It should be understood, however, that the present disclosure is to be considered an exemplification of the principles of the invention and is not intended to limit the spirit or scope of the invention and/or claims of the embodiments illustrated.

With reference to FIGS. 1-4 there is provided a pan 100, used for baking, roasting, or simply used for preparing and storing meals. The pan 100 includes a bottom base 105 terminated to an bottom edge that meets with a sidewall 110. The sidewall may be a single continuous sidewall or be sectioned into various sides (i.e. front, rear, left, right, or angled sides). Therefore the shape of the pan may be changed into various geometrically shapes, such as but not limited to a square, rectangular, circular, or other symmetrical polygonal shape. The sidewall 110 extends upwardly forming a depression or well 115 for which food can be placed. The sidewall 110 terminates at an edge 120 where it meets and forms into an outwardly extending ridge 125 that substantially surrounds the entire bottom base 105. The ridge 125 may have a length away from the sidewall that is uniformally dimensioned around the entire sidewall or it may extend further about a pair of opposing sides or edges of the pan 100 to form elongated handles. As is common with the commercial sale of these types of pans 100, a label is often affixed to the inside portion of the bottom base 105 within the well 115. However, the current invention forms a new type of label and a new use for the label not known in the prior art.

Figure 7A:
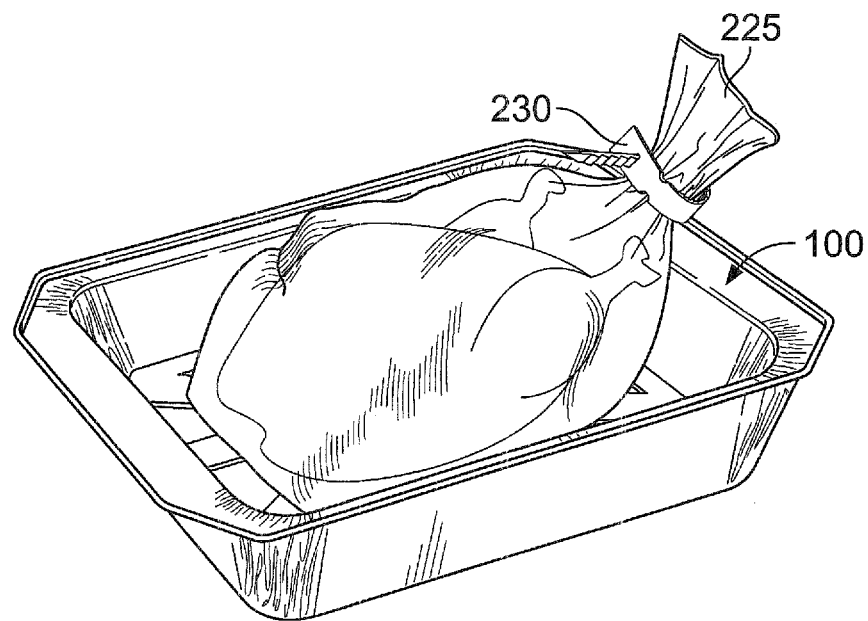
FIG. 7A is a perspective view of the use of the pan and roasting bag.
Figure 7B:
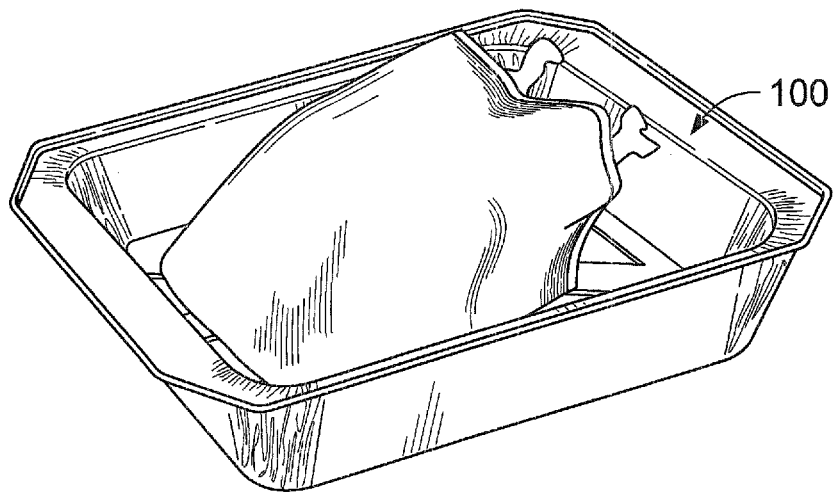
FIG. 7B is a perspective view of the use of the pan and aluminum foil.

The label 200 includes a front side 205 and a rear side 210. The front side 205 would most likely have some form of indicia printed about the manufacturer, the contents, and other information about the pan, sale thereof, etc. The rear side 210 would include a means of securing 215 the label 200 to the pan itself, such as a strip of adhesive, glue or epoxy spots, etc. In addition, the rear side 210 of the label 200 includes a formed pocket 220 for the receiving and holding roasting materials. These roasting materials may include but are not limited to a roasting bag 225, a roasting tie 230, promotional materials, or aluminum foil or other similar items. The label and pocket may be formed from a single sheet of material or may be separate and formed together around edges (either both the edges together or having the edges of the pocket formed to the rear side of the label) to create the pocket. Once formed, the pocket 220 can be used to store and transport the roasting bag 225 and a roasting tie 230. The pocket 220, because it is placed flat against the bottom base 105 of the pan, will remain closed. However, if needed the pocket 220 can include a means for sealing the pocket shut, for example, a reusable, re-sealable plastic zipper can be used or secondary epoxy spots can be used to help keep the pocket sealed until used. The consumer can then easily remove the label open the pocket and remove the roasting materials. As shown in FIGS. 5-7A, the roasting bag is used to receive a food item the tie helps seal the bag shut during cooking and then the contents can be placed on the pan 100. As shown in FIG. 7B, the pan is used with aluminum foil that is shipped, transporting and carried with the pan.

In another aspect of the invention there is provided a method of attaching roasting materials to a pan. In a first step, a pan is provided to include at least a bottom portion and sides extending from the bottom portion to form a well. In a second step, the label is provided which can be affixed to the bottom portion of the pan. The label has a pocket formed on one side of the label to define an interior pocket region. Upon obtaining the label, roasting material is placed within the pocket region and then the label is affixed to the pan.

Figure 9A:
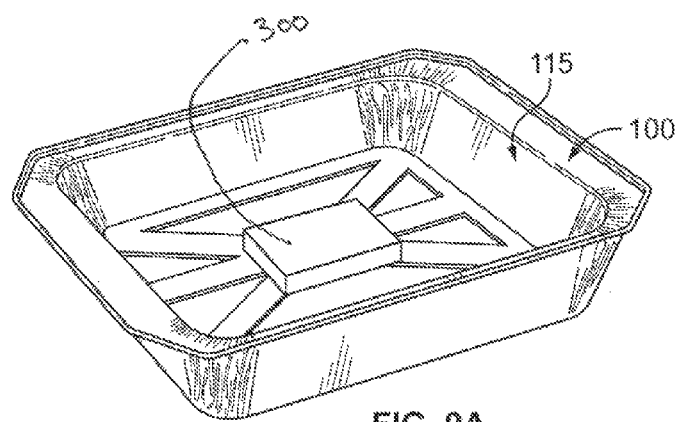
FIG. 9A is a perspective view of a pan having a box for holding at least a roasting material in accordance with another embodiment of the invention.
Figure 9B:
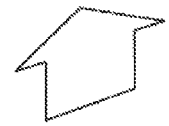
FIG. 9B is a perspective view of the box and roasting material from FIG. 9A.
Figure 9B:
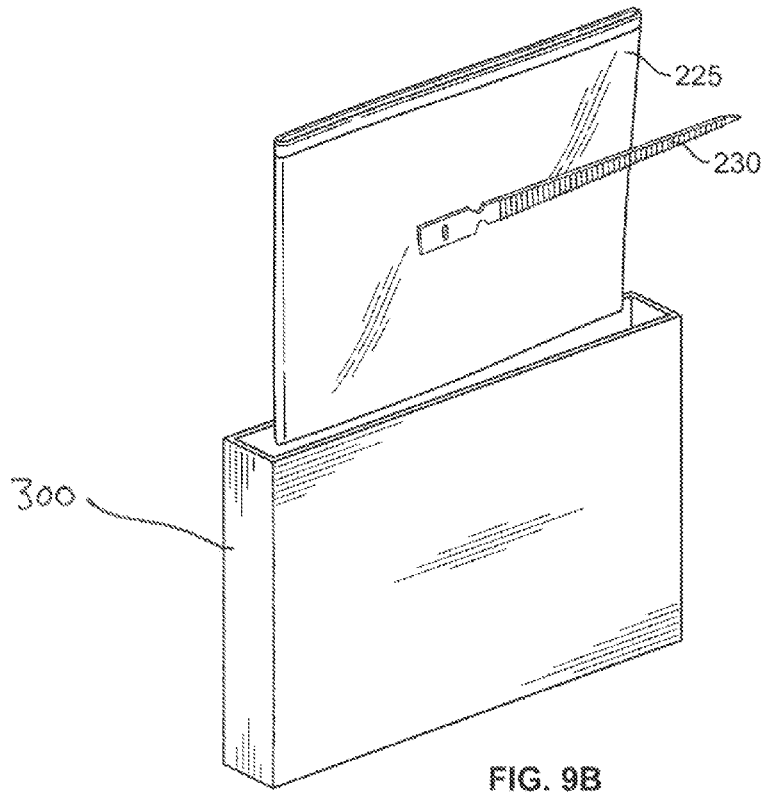

Referring now to FIGS. 9A and 9B, in another aspect of the invention the roasting materials could be placed inside a small box 300, which is then affixed to the bottom portion 105 of the pan 100. The small box 300 could be substantially flat to hold the roasting materials and thus not take up a large area, especially for transport and display on shelves. In another aspect of the invention, the roasting materials could be secured directed to the bottom portion of the pan. An adhesive, epoxy or tape could be used to affix the roasting materials directly to the pan.

Figure 8A:
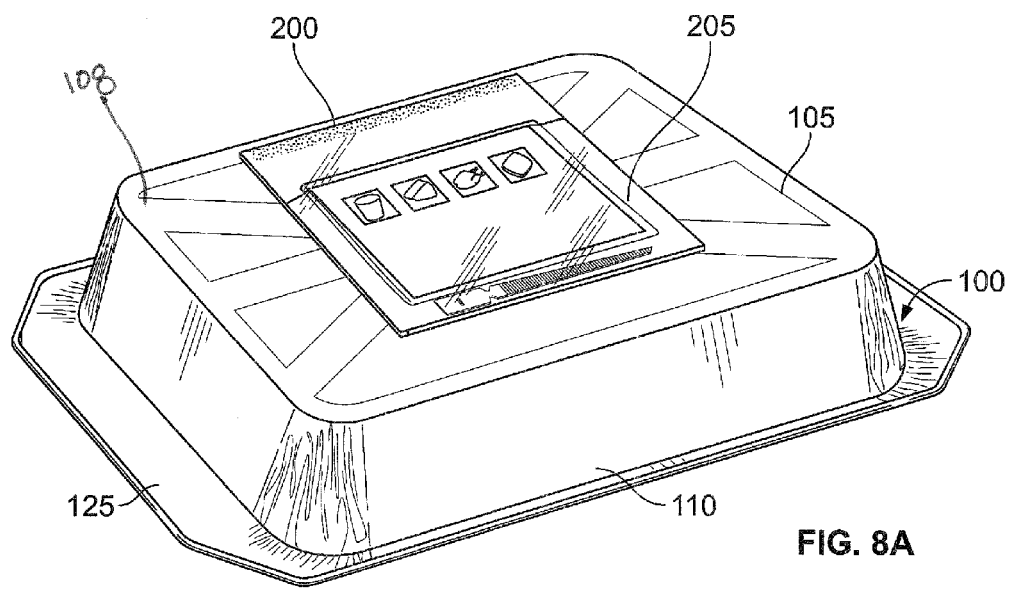
FIG. 8A is a perspective view of a pan having a label pouch for holding at least a roasting material in accordance with another embodiment of the invention.
Figure 8B:
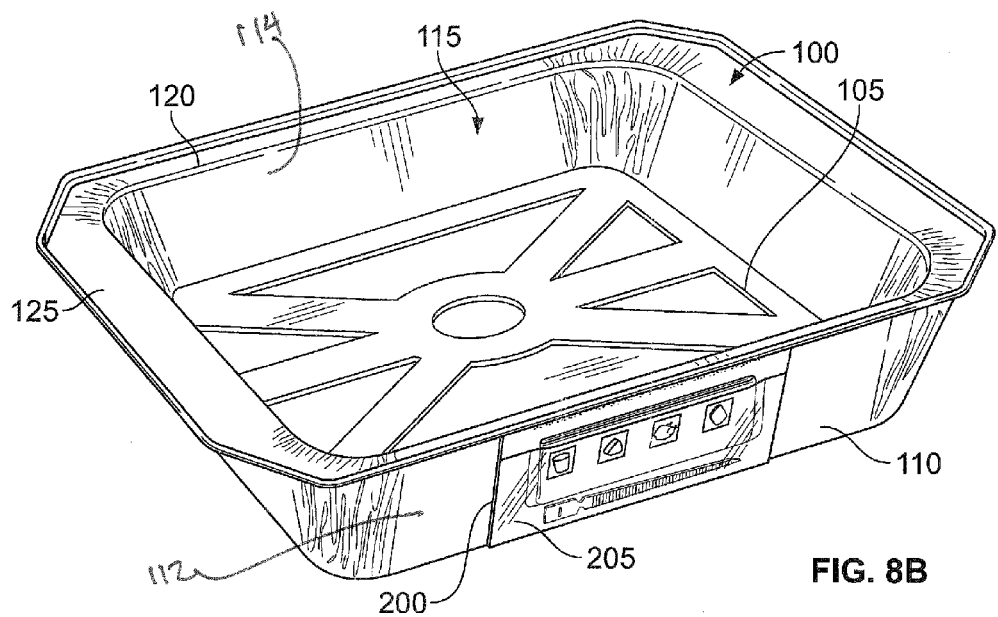
FIG. 8B is a perspective view of a pan having a label pouch for holding at least a roasting material in accordance with another embodiment of the invention.

In FIGS. 8A and 8B, there are shown other embodiments of the present invention. In FIG. 8A, the label pouch 200 is affixed to an outside surface 108 of the bottom of the pan 105. In FIG. 8B, the label pouch 200 is affixed to an outside surface 112 of the side wall 110. Similarly, the label pouch may be affixed to an inside surface 114 of the side wall.

One of the main advantages of the present embodiment is that it provides a flat, easy, and inexpensive manner for transporting the roasting bag and tie with the pan. Therefore, the pans can still be stacked or nested with each other for display on the store and when separated for individual purchase, the label and more importantly, the pouch with its contents, will separate and be purchased by the consumer as a single combined kit or item.

From the foregoing and as mentioned above, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

We claim:

1. A combination comprising:
    a pan defined by a bottom base having a base periphery edge and a sidewall extending upwardly from the base periphery edge and terminating at a side edge to create a well therebetween;
    a label having a front side and a rear side, the rear side of the label being secured to a surface of the pan, a pocket formed on the rear side of the label and said pocket having an access opening into an internal space of the pocket; and
    a roasting bag being positioned within and removable from the pocket of the label.

2. The pan of claim 1, wherein the rear side of label includes a means of securing the label to the bottom base.

3. The combination of claim 1, wherein the pocket is formed from a material separate from the label.

4. The pan of claim 2, wherein the means of securing the label to the bottom base includes epoxy.

5. The pan of claim 1, wherein the surface for which the label is secured thereto is an inside surface of the bottom base defined within the well of the pan.

6. The pan of claim 1, wherein the surface for which the label is secured thereto is an outside surface of the bottom base defined by the well of the pan.

7. The pan of claim 1, wherein the surface for which the label is secured thereto is an inside surface of the sidewall defined by the pan.

8. The pan of claim 1, wherein the surface for which the label is secured thereto is an outside surface of the sidewall defined by the pan.

9. A combination comprising:
    a pan defined by a bottom base having a base periphery edge and a sidewall extending upwardly from the base periphery edge and terminating at a side edge to create a well therebetween;
    a label being secured to the pan and being positioned substantially flat, a pocket formed on the label and said pocket having an access opening into an internal space of the pocket;
    roasting material being positioned within and removable from the pocket of the label, and wherein the roasting material positioned within the pocket is selected from one or more of the following items, a roasting bag, a roasting bag tie, and aluminum foil.

10. The combination of claim 9 further includes a means for sealing the pocket in a closed position.

11. The combination of claim 9, wherein the pocket is formed from a material separate from the label.

12. The combination of claim 9, wherein the label includes a front side and a rear side, and the rear side of the label is affixed to the well.

13. The combination of claim 12, wherein the pocket is formed on the rear side of the label.

14. The combination of claim 9, wherein the surface for which the label is secured thereto is an inside surface of the bottom base defined within the well of the pan.

15. The combination of claim 9, wherein the surface for which the label is secured thereto is an outside surface of the bottom base defined by the well of the pan.

16. The combination of claim 9, wherein the surface for which the label is secured thereto is an inside surface of the sidewall defined by the pan.

17. The combination of claim 9, wherein the surface for which the label is secured thereto is an outside surface of the sidewall defined by the pan.

18. A method of attaching a roasting bag to a pan, comprising the steps of:
    providing a pan having at least a bottom portion and sides extending from the bottom portion to form a well;
    obtaining a label to affix to a portion of the pan, the label having a pocket formed on one side of the label to define an interior pocket region;

placing within the interior pocket region a roasting bag; and affixing the label to the portion pan.

19. The method of claim 18, wherein the label includes a front side and a rear side and the pocket is formed to the rear side of the label.

20. The method of claim 19, wherein the portion of the pan defined for affixing the label thereto is selected from one of the following surfaces: an inside surface of the bottom portion defined within the well of the pan; an outside surface of the bottom portion defined within the well of the pan; an inside surface of one of the sides defined by the pan; or an outside surface of one of the sides defined by the pan.

21. A method of attaching a roasting bag to a pan, comprising the steps of:
   providing a pan having at least a bottom portion and sides extending from the bottom portion to form a well;
   obtaining a label to affix to a portion of the pan, the label having a pocket formed on one side of the label to define an interior pocket region;
   placing within the interior pocket region roasting material, and wherein the roasting material is selected from one or more of the following items, a roasting bag, a roasting bag tie, or aluminum foil; and
   affixing the label to the portion of the pan.

22. The method of claim 21, wherein the label includes a front side and a rear side and the pocket is formed to the rear side of the label.

23. The method of claim 21, wherein the portion of the pan defined for affixing the label thereto is selected from one of the following surfaces: an inside surface of the bottom portion defined within the well of the pan; an outside surface of the bottom portion defined within the well of the pan; an inside surface of one of the sides defined by the pan; or an outside surface of one of the sides defined by the pan.

24. A combination comprising:
   a pan defined by a bottom base having a base periphery edge and a sidewall extending upwardly from the base periphery edge and terminating at a side edge to create a well therebetween;
   a label having a front side and a rear side, the rear side of the label being secured to a portion of the pan, a pocket formed on the rear side of the label and said pocket having an access opening into an internal space of the pocket; and
   a plurality of aluminum foil sheets being positioned within and removable from the pocket of the label.

25. The combination of claim 24, wherein the portion of the pan defined to affix the label thereto is selected from one of the following surfaces: an inside surface of the bottom portion defined within the well of the pan; an outside surface of the bottom portion defined within the well of the pan; an inside surface of one of the sides defined by the pan; or an outside surface of one of the sides defined by the pan.

26. A pan comprising:
   a pan defined by a bottom base having a base periphery edge and a sidewall extending upwardly from the base periphery edge and terminating at a side edge to create a well therebetween;
   roasting material being secured within the well of the pan and wherein the roasting material is selected from one or more of the following items, a roasting bag, a roasting bag tie, or aluminum foil; and
   a label having a front side and a rear side, the rear side of the label being secured to the bottom base within the well, a pocket formed on the rear side of the label and said pocket having an access opening into an internal space of the pocket and the roasting materials being positioned within and removable from the pocket of the label.

* * * * *